United States Patent Office 3,254,134
Patented May 31, 1966

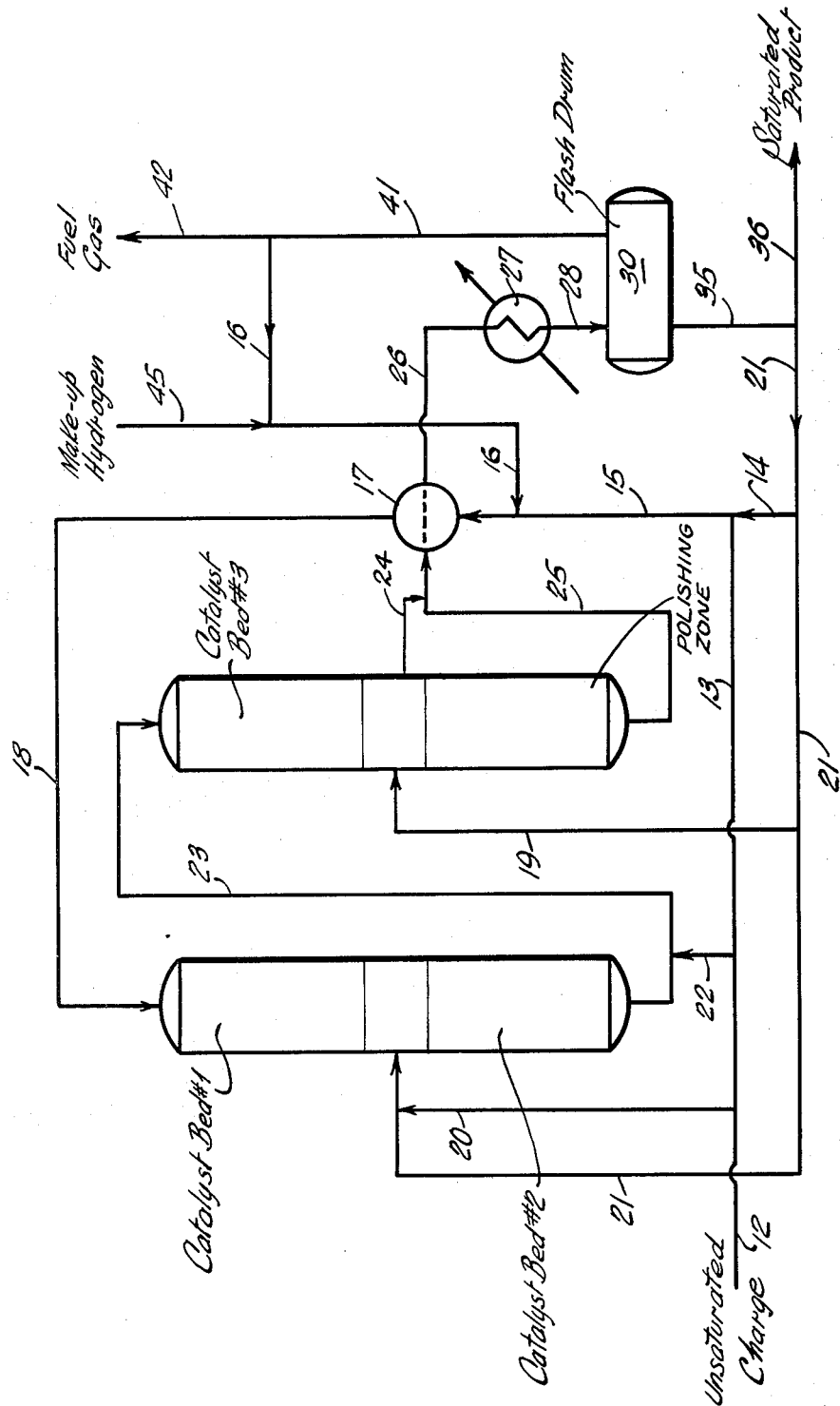

3,254,134
PLURAL STAGE HYDROGENATION OF
AROMATICS
Randlow Smith and Edward F. Janes, Houston, Tex.,
assignors to Texaco Inc., New York, N.Y., a corporation of Delaware
Filed Apr. 5, 1965, Ser. No. 446,793
13 Claims. (Cl. 260—667)

This application is a continuation-in-part of our copending application Ser. No. 239,175, filed Nov. 21, 1962, now abandoned. This invention relates to the hydrogenation of unsaturated hydrocarbons. More particularly, the invention relates to the hydrogenation of olefins, diolefins and aromatic compounds such as, for example, butene, butadiene and benzene, toluene, xylenes and naphthalene. In one of its more specific applications, the present invention relates to the production of pure cyclohexane from pure benzene.

Hydrogenation of unsaturated hydrocarbons is a highly exothermic reaction and when this reaction is carried out in the presence of a catalyst considerable care must be taken to avoid excessively high temperature which result in the cracking of the feed stock and the deposition of carbon on the catalyst. The formation of coke on the catalyst results in loss of activity thereby necessitating interruption of the process sequence for regeneration of the catalyst.

One early attempt to solve this problem involved placing the catalyst in narrow tubes and surrounding these tubes with a heat exchange medium to remove the exothermic heat of the hydrogenation reaction. Other attempts have been made to solve this problem by the extensive use of heat exchangers whereby the reactants are removed from the catalyst bed, passed through heat exchangers or coolers and then returned to the same or to another catalyst bed. These methods, however, for the most part, have been unsatisfactory and require expensive equipment.

It is an object of the present invention to provide a novel process for the hydrogenation of unsaturated hydrocarbons. It is a further object of the present invention to convert benzene, toluene and xylenes to the corresponding saturated cyclic hydrocarbons. It is a further object of the present invention to carry out the hydrogenation of unsaturated hydrocarbons with the substantial elimination of heat exchange apparatus. It is a still further object of the present invention to carry out the catalytic hydrogenation of unsaturated hydrocarbons in a continuous manner substantially free from catalyst regeneration. These and other objects will be obvious to those skilled in the art from the following description.

According to the process of the present invention, hydrogen is passed serially through a plurality of catalytic reaction zones. In addition to the hydrogen, unsaturated hydrocarbon feed and saturated hydrocarbon, for example hydrogenation product, are introduced into the first reaction zone. Unsaturated feed and saturated hydrocarbon are added to the effluent from each reaction zone as it is charged to the next succeeding reaction zone with the exception that of the two hydrocarbons mentioned only unsaturated feed is added to the charge to the final reaction zone.

If desired the effluent from the final reaction zone may be passed through a "polishing" zone where the last vestiges of unreacted feed are hydrogenated. Depending on the temperature of the effluent from the final reaction zone and the temperature rise across the polishing zone, saturated hydrocarbon may be added to the charge to the polishing zone either to cool effluent from the final reaction zone or to act as a heat absorbent or both.

The process sequence may be better described in a preferred embodiment in which four catalyst beds are used, the first three serving as reaction zones and the fourth serving as a polishing zone, the feed is benzene and the product is cyclohexane. In this preferred embodiment, two catalytic reactors are employed, each reactor containing two catalyst beds separated by a mixing chamber. Hydrogen, benzene and cyclohexane are introduced into the first catalytic bed. To the effluent from the first catalytic bed, benzene and cyclohexane are added and the resulting mixture is introduced into the second catalytic bed. Benzene alone is added to the effluent from the second catalytic bed and the resultant mixture is introduced into the third catalytic bed. Cyclohexane may be recovered from the effluent from the third catalyst bed or if desired product cyclohexane may then be added to the effluent from the third catalytic bed and the mixture so produced passed through the catalytic polishing zone. It is also possible to pass the effluent from the third catalytic bed through the polishing zone without the addtion of hydrocarbon thereto.

Temperature control is an important consideration in the hydrogenation of unsaturated hydrocarbons. For example the hydrogenation of benzene is a highly exothermic reaction and should be carried out at a temperature not above 500° F. Above 500° F. equilibrium favors the formation of undesirable isomers such as methylcyclopentane. At 550° F. and higher, exothermic hydrocracking begins with the liberation of more heat and the possibility of runaway reaction. This results in the loss of selectivity and the loss of activity of the catalyst. The method of temperature control in the process of the present invention by the specific manner of adding feed and product to the reaction mixture eliminates the need for catalyst tubes and inter-bed heat exchangers. It is also possible in the present process to introduce the reactant mixture into a catalyst bed at temperatures higher than was practiced in the processes of the prior art thereby permitting the reactants to remain in contact with the catalyst at more suitable reaction temperatures to effect greater conversion using less catalyst.

The feed for the process of the present invention comprises unsaturated hydrocarbons such as olefins, diolefins and compounds containing an aromatic ring, as for example butene, butadiene and benzene, toluene, xylenes and naphthalene. The process of the invention is particularly suitable for the production of pure cyclohexane from pure benzene.

Any hydrogenation catalyst may be used in the process of the present invention. Particularly suitable hydrogenation catalysts include nickel, platinum, palladium, cobalt, iron and compounds thereof or their mixtures. Advantageously the catalyst is composited with a carrier such as magnesia, zirconia, alumina, silica and kieselguhr. The preferred catalyst is nickel on alumina.

Hydrogen from any suitable source may be used in the present process. Electrolytic hydrogen, by-product hydrogen produced by the catalytic reforming of petroleum naphtha or hydrogen produced by partial combustion of a carbonaceous fuel followed by shift conversion may be used. Advantageously, to protect the catalyst if it is sulfur sensitive and also if it is desired to produce a pure product, sulfur compounds, if present, should be removed from the hydrogen. The hydrogen need not necessarily be pure hydrogen but may contain small amounts of normally vaporous hydrocarbons such as methane or ethane. Thus, the term "hydrogen" as used in the present specification and claims includes dilute hydrogen unless otherwise specified. Preferably the hydrogen should be at least of about 65% purity. However, when a product of high purity is desired, the hydrogen purity should be at least about 98%.

Pressure in the hydrogenation zone may range up to about 1000 p.s.i.g. or higher. Preferred pressures lie within the range of about 350–800 p.s.i.g. Ordinarily the temperature will range between about 100 and 500° F., preferably between about 275 and 500° F. The $H_2$ to charge mol ratio should be between 6 and 15:1 with 9 to 10 mols of $H_2$ per mol of charge being preferred. The liquid hourly space velocity, that is the total volume of liquid charge per total volume of catalyst per hour, will range between 0.5 and 5, preferably between about 0.75 and 2. The product is recycled as required to control the reaction temperature, usually an overall 2.0–3.0 product to charge volume ratio is satisfactory.

For a better understanding of the invention reference is made to the accompanying drawing with reference to which a specific example is described.

Unsaturated charge which in this example is pure benzene is introduced into the system through line 12. Recycle cyclohexane from line 14 is added to the benzene in line 13 and the mixture proceeds through line 15. With hydrogen from line 16 it passes through heat exchanger 17 where it is brought to a temperature of about 260° F. and then is transferred by means of line 18 to catalyst bed #1. The hydrogen from line 45 has an analysis of 98 mol percent hydrogen and 2 mol percent methane. The benzene introduced into catalyst bed #1 amount to 39 volume percent of the entire benzene charge and 2.87 mols of cyclohexane are introduced through line 14 per mol of benzene from line 13. Catalyst beds #1, #2, #3 and the polishing zone catalyst bed are made up of nickel on alumina pellets containing 43% by weight nickel.

The reaction mixture which leaves catalyst bed #1 at a temperature of 500° F. has added thereto benzene charge from line 20 amounting to 36 volume percent of the total benzene charge and cyclohexane from line 21 at a rate of 2.6 mols per mol of benzene from line 20. The addition of this material is sufficient to cool the reaction mixture to 321° F. at which temperature it passes into catalyst bed #2. In catalyst bed #2 the mixture due to the hydrogenation reaction again attains a temperature of about 500° F.

Benzene amounting to 25% of the total benzene charge is added to the effluent from catalyst bed #2 through line 22 and the resulting mixture which has a temperature of about 388° F. is introduced into catalyst bed #3 by means of line 23. The exothermic heat of the reaction in catalyst bed #3 results in the mixture leaving the catalyst bed at a temperature of 490° F. At this point only cyclohexane from line 19 is added to the effluent from catalyst bed #3 in an amount sufficient to cool the mixture to such a temperature that the product mixture leaving the polishing zone has a temperature between 490 and 500° F. The final product mixture leaves the catalyst polishing zone through line 25, passes through heat exchanger 17 in indirect heat exchange relationship with the feed to the catalyst bed #1, thence through line 26, cooler 27 and line 28 to flash drum 30 where a separation is made between the gaseous material and the liquid product. The liquid which is 99.6% cyclohexane is withdrawn from flash drum 30 through line 35. A portion of the liquid product is withdrawn from the system through line 36 and the balance is recycled through line 21. Gaseous material leaves flash drum 30 through line 41, a portion being removed from the system through line 42 and the balance recycled through line 16. Make-up hydrogen to replace that consumed by the hydrogenation and that purged from the system through line 42 is introduced into the system through line 45.

The above description concerns one specific embodiment of the invention. It is also possible when the effluent from catalyst bed #3 is at a sufficiently low temperature to pass said effluent through the polishing zone without the addition thereto of any saturated material, for example cyclohexane. It is also possible to pass the effluent from catalyst bed #3 directly to heat exchanger 17 by means of lines 24 and 25.

In the past it has been the custom to introduce the reactants into the catalyst chamber at ordinary temperatures and to gradually heat the reactants as they are introduced into the catalyst bed thereby gradually bringing the temperature of the catalyst bed to reaction temperature. The present technique avoids the introduction of the reactants into a hot catalyst bed which could result in cracking and runaway reactions. It has now been found that the process can be started more smoothly if the catalyst is brought to reaction temperature by being contacted with heated saturated hydrogenation product and then the reactants introduced while maintaining the flow of heated hydrogenation product. By so doing the catalyst is brought to reaction temperature and the reactants are introduced at reaction temperature thereby avoiding the long gradual preliminary heating step employed in the processes of the prior art.

To prevent contamination of the product when a pure product is desired both the feed and the hydrogen should be substantially pure. When the hydrogen is contaminated with compounds such as hydrocarbons the purification of the hydrogen may be effected by means of a cryogenic unit in which liquid nitrogen for example is used as a heat exchange medium to liquefy the contaminants. It is also possible to purify the hydrogen by passing it in contact with a molecular sieve having uniform 4 angstrom unit or 5 angstrom unit pore openings, silica gel or charcoal. When the hydrogen contains acidic impurities such as hydrogen sulfide, advantageously these impurities are removed by scrubbing with a solution of a basic material such as ethanolamine. It is also possible to use any combination of these various methods for purification of the hydrogen.

The use of a polishing bed is particularly desirable in circumstances where it is desired to obtain substantially quantitative conversion. For example when it is proposed to produce substantially pure cyclohexane from benzene a polishing catalyst bed may be used to advantage.

Whether or not saturated hydrocarbon such as cyclohexane is added to the charge to the polishing bed will depend on the temperature of the effluent from the final reaction zone and its unsaturated content. If the effluent temperature is sufficiently low that hydrogenation of the residual unsaturated hydrocarbon charge will not cause the temperature to rise to an excessive level then no saturated material need be added. However, if the hydrogenation of the residual unsaturated charge will result in an excessive temperature rise across the polishing bed then it is advisable to add saturated material to the charge to the polishing zone. The polishing zone is defined as a catalytic zone in which the unsaturated material present in the feed thereto has already passed through a catalytic hydrogenation reaction zone.

Obviously, many modifications and variations of the invention as hereinbefore set forth may be made without departing from the spirit and scope thereof and therefore only such limitations should be made as are indicated in the appended claims.

We claim:

1. A process for the production of saturated cyclic hydrocarbons by catalytic hydrogenation of the corresponding unsaturated cyclic hydrocarbon which comprises passing a stream of hydrogen serially through a plurality of catalytic reaction zones maintained at hydrogenation condition of temperature and pressure, the effluent from each reaction zone being introduced into the next succeeding reaction zone, introducing unsaturated cyclic hydrocarbon charge and saturated hydrocarbon diluent to each reaction zone preceding the final reaction zone and of the hydrocarbon materials mentioned adding only unsaturated charge to the feed to the final reaction zone.

2. The process of claim 1 in which the hydrogenation temperature does not exceed about 500° F.

3. The process of claim 1 in which the unsaturated charge comprises benzene and the saturated hydrocarbon product comprises cyclohexane.

4. The process of claim 1 in which the unsaturated hydrocarbon feed comprises toluene and the saturated hydrocarbon product comprises methylcylclohexane.

5. The process of claim 1 in which the unsaturated hydrocarbon feed comprises xylene and the saturated hydrocarbon product comprises dimethylcyclohexane.

6. The process of claim 1 in which the unsaturated hydrocarbon feed comprises naphthalene and the saturated hydrocarbon product comprises decahydronaphthalene.

7. The process of claim 1 in which the hydrogenation catalyst comprises nickel on alumina.

8. The process of claim 1 in which prior to the initial introduction of charge and hydrogen to the catalyst, substantially all of the catalyst is brought to reaction temperature by being contacted with heated saturated hydrocarbon material.

9. The process of claim 8 in which the charge is benzene and the saturated hydrocarbon material is cyclohexane.

10. The process of claim 1 in which the effluent from the final reaction zone is introduced into a polishing zone.

11. The process of claim 10 in which saturated hydrocarbon product is added to the feed to the polishing zone.

12. The process of claim 11 in which the unsaturated feed comprises benzene and the saturated hydrocarbon product comprises cyclohexane.

13. A process for the production of a saturated cyclic hydrocarbon by the catalytic hydrogenation of the corresponding unsaturated cyclic hydrocarbon which comprises passing a stream of hydrogen serially through at least three catalytic hydrogenation zones maintained at hydrogenation conditions of temperature and pressure, the effluent from each reaction zone being introduced into the next succeeding reaction zone, introducing unsaturated hydrocarbon charge and saturated hydrocarbon diluent to each reaction zone except the last two reaction zones and, of the two types of hydrocarbon mentioned, adding only unsaturated hydrocarbon to the feed to the final reaction zone and adding only saturated hydrocarbon to the effluent from the final reaction zone and passing the resulting mixture to a catalytic polishing zone.

References Cited by the Examiner

UNITED STATES PATENTS

| | | | |
|---|---|---|---|
| 2,821,561 | 1/1958 | Pevere et al. | 260—667 |
| 2,878,179 | 3/1959 | Hennig | 208—210 |
| 2,934,573 | 4/1960 | Paulsen et al. | 260—667 |
| 2,977,288 | 3/1961 | Cabbage | 260—667 |

DELBERT E. GANTZ, *Primary Examiner.*

S. P. JONES, *Assistant Examiner.*